United States Patent
Inui et al.

(10) Patent No.: US 6,949,898 B2
(45) Date of Patent: Sep. 27, 2005

(54) HYBRID TYPE WORKING MACHINE

(75) Inventors: Tsutomu Inui, Saitama (JP); Tsutomu Wakitani, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 10/795,439

(22) Filed: Mar. 9, 2004

(65) Prior Publication Data

US 2004/0222757 A1 Nov. 11, 2004

(30) Foreign Application Priority Data

Mar. 13, 2003 (JP) ........................................ 2003-067963

(51) Int. Cl.[7] .............................................. F02D 29/00
(52) U.S. Cl. ......................... 318/151; 318/153; 318/157
(58) Field of Search ................. 318/139–141, 318/144–148, 151–154, 157; 388/800, 816

(56) References Cited

U.S. PATENT DOCUMENTS

| | | | | |
|---|---|---|---|---|
| 3,771,821 A | * | 11/1973 | Rist et al. ...................... | 290/14 |
| 3,923,115 A | * | 12/1975 | Helling ....................... | 180/65.2 |
| 4,148,192 A | * | 4/1979 | Cummings ................... | 60/716 |
| 5,828,554 A | * | 10/1998 | Donegan et al. ............. | 361/707 |
| 5,831,341 A | * | 11/1998 | Selfors et al. ................ | 290/52 |

FOREIGN PATENT DOCUMENTS

| | | |
|---|---|---|
| JP | 02-145118 | 6/1990 |
| JP | 2001-161104 | 6/2001 |
| JP | 2001-161114 | 6/2001 |

* cited by examiner

*Primary Examiner*—Bentsu Ro
(74) *Attorney, Agent, or Firm*—Westerman, Hattori, Daniels & Adrian, LLP

(57) ABSTRACT

The output of an engine driven generator G is directly supplied to a motor 7 for travel without the intermediary of a battery. The output capacity of each of the generator G and motor 7 is determined so that the maximum output of the generator G may substantially coincide with the maximum control electric power that is supplied to the motor 7. The over-current with respect to the motor is suppressed by the output impedance of the generator G. A CPU 102 performs output control so as for the output to conform to the load according to the electric current with respect to the motor. If the electric current increases, the voltage is varied to a level thereof that conforms to that electric current for ensuring sufficient torque.

7 Claims, 4 Drawing Sheets

HYBRID TYPE WORKING MACHINE

BACKGROUND OF THE INVENTION

1. Field of the Invention

The present invention relates to a hybrid type working machine that is equipped with an engine and an electric power-driven motor (motor) each of that serves as the power source, and more particularly to a hybrid type working machine that is constructed so that the output of a generator that is driven by the engine may be supplied directly to the motor without the intermediary of a battery.

2. Description of the Related Art

In a working machine such as a power tiller and lawn mower, in the ordinary working that is done outdoors, the machine that uses an engine as the power source, whereas, in the area where a low level of operation sounds is required, the machine that uses a motor as the power source was employed. Like this, conventionally, the working machine that is driven by the engine and that which is driven by the motor were individually separately employed uniquely to the use purposes.

In contrast, there have in recent years been proposed so-called hybrid type working machines that use both of the engine and motor as the power source in the way that they are used as hybridization. For example, a Japanese official gazette of Japanese Patent Application Laid-Open No. 2001-161114 discloses a car type farming working machine wherein a working machine is mounted to an automotive vehicle for travel, in which to a driving system for the working machine side and that for the generator that has been loaded on the automotive vehicle for travel there is transmitted the power that is delivered from the engine. And, when the load that is applied to the engine from the working machine is small in magnitude, the generator is driven by the surplus power of the engine, and the surplus energy is accumulated in a relevant battery as the electric power. This car type farming working machine is a hybrid type working machine that attaches importance to the efficient use of energy so that the load to the engine may be maintained within a proper range of values; and that the battery may be able to be used as the source of driving the motor.

On the other hand, in a Japanese official gazette of Japanese Patent Application Laid-Open No. 2001-161104, there is disclosed a hybrid type managing machine (working machine) wherein for driving the travel of a managing machine main body and for driving the generator there is used an engine power, whereby the managing machine main body is driven using a motor the power source of that is a battery that has been electrically charged by the generator. This hybrid type managing machine has been improved in operating efficiency with conceiving the easy controllability of a motor enabling simplifying the complex working-machine operation mechanism.

The above-described hybrid type working machine and managing machine each necessitate the use of a battery in order to store once the generation output of the generator that is driven by a relevant engine. Accordingly, even if the working machine is small in size, increasing the size, as well as increasing the weight, of it was inevitable by the extent to which the battery has been loaded.

SUMMARY OF THE INVENTION

The present invention has been made to solve the above-described points of problem and has an object to provide a hybrid type working machine that has no battery loaded thereon.

To attain the above object, the present invention has a first characterizing feature in that it provides A hybrid type working machine, having a generator that is driven by an engine and a motor that is driven by an electric power that is supplied from the generator, wherein the motor is driven by having directly supplied thereto only the electric power generated from the generator; and the output capacity of each of the generator and motor is determined so that the maximum output electric power of the generator that is limited by the output impedance of the generator may fall under the maximum control electric power that is supplied to the motor.

According to the first characterizing feature, unlike the arrangement wherein an auxiliary power source such as a battery is provided to store the output of the relevant generator; and from this auxiliary power source to the motor there is supplied an electric power, only the generator that is connected directly to the motor without the intermediary of a battery, etc. is used as the power source for the motor. And, since the maximum electric current of the generator that is limited by the output impedance of it is set to within a range of the maximum electric current that is supplied to the motor, the use of a protection circuit with respect to the over-current is unnecessary.

The present invention has a second characterizing feature in that it provides a hybrid type working machine wherein in the first characterizing feature the engine is subjected to a substantially fixed speed operation to compose a driving source for a working machine main body; and the motor composes a driving source for moving the working machine. According to the second characterizing feature, by the engine that is rotated with a substantially fixed speed, there can be obtained an appropriate working output for the working machine main body. And the movement of the working machine can be simply made through control of the speed of the motor.

The present invention has a third characterizing feature in that it provides a hybrid type working machine wherein in the second characterizing feature in correspondence with the status of load of the motor an electric power is supplied thereto so as to maintain the number of rotations of the motor to be the one that corresponds to a substantially fixed speed; and at the time of overload's being applied to the motor the amount of electric power supplied thereto is decreased. According to the third characterizing feature, an electric power that corresponds to the magnitude of load is supplied to the motor, and the number of rotations is maintained at a substantially fixed speed. At the time of the over-load to the motor there is supplied, the amount of electric power supplied is decreased, whereby the moving speed of the working machine is decreased. Accordingly, the work that is performed using the working machine main body can continue to be done without hindrance.

The present invention has a fourth characterizing feature in that it provides a hybrid type working machine wherein in one of the preceding first to third features the generator is a single-phase generator; the motor is a universal motor; and the machine comprises control means that controls the output of the generator by the alternating current phase control that is performed by means of a bi-directional thyristor. According to the fourth characterizing feature, the circuit construction at an output stage to the motor is simple.

The present invention has a fifth characterizing feature in that it provides a hybrid type working machine wherein in one of the preceding first to third features the generator is a three-phase generator; the motor is a DC motor; and the machine comprise control means that controls the output of the generator by the phase control that is performed by means of a thyristor bridge.

According to the fifth characterizing feature, since it is possible to take out the output of the generator with a high efficiency, it is possible to achieve reduction in size as well as increasing the capacity.

The present invention has a sixth characterizing feature in that it provides a hybrid type working machine wherein in one of the preceding first to third features output windings of the generator are constructed in the way that a mode in which they are connected in parallel to each other and a mode in which they are connected in series to each other are freely switchable between the modes; and, when an ordinary operation is performed, the output windings are used in the form of their being connected in series and, when making the torque of the motor increase, the output windings are switched to the mode in which they are connected in parallel to each other.

According to the sixth characterizing feature, by a control that is performed with respect to switching the connection of the windings, it is possible to simply select the output correspondingly to the status of operation.

DETAILED DESCRIPTION OF THE PREFERRED EMBODIMENTS

Figure 2:
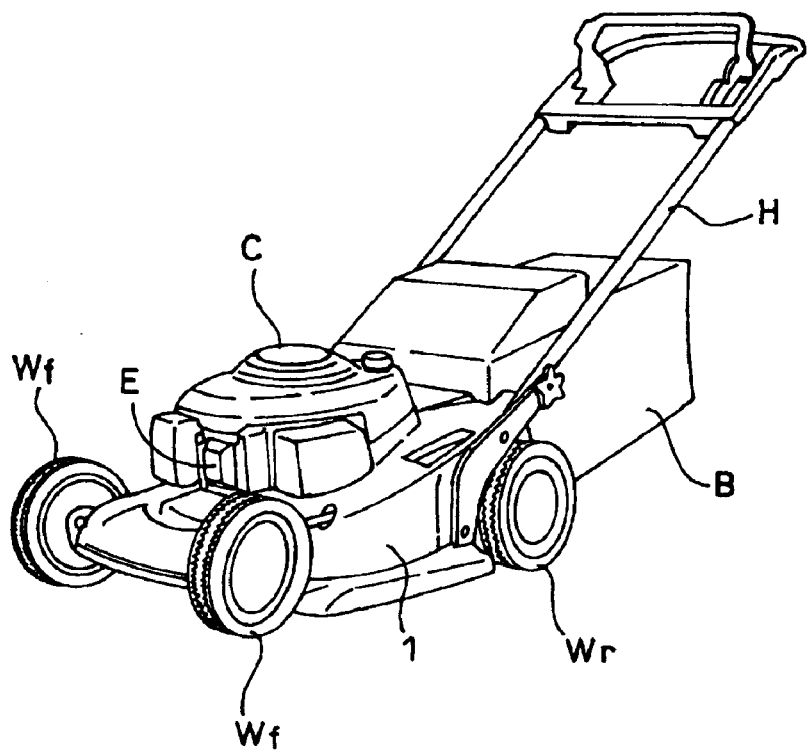
FIG. 2 is a perspective view of a lawn mower according to the embodiment of the present invention.
Figure 3:
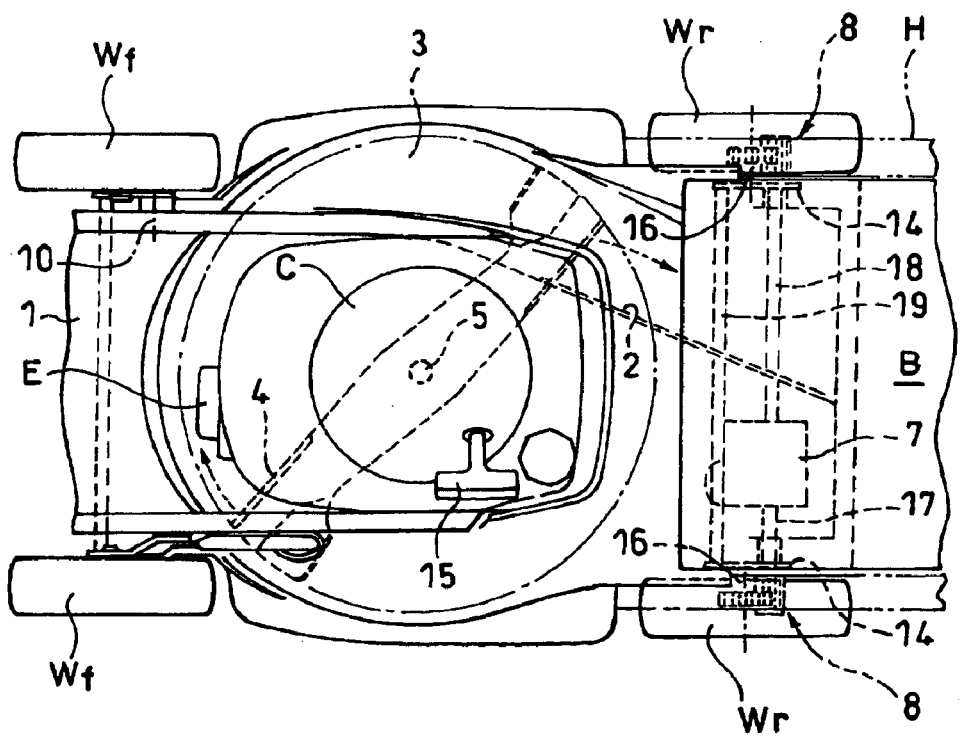
FIG. 3 is a plan view illustrating a main part of the lawn mower according to the embodiment of the present invention.

A description will be in detail given below of an embodiment according to the present invention with reference to the accompanying drawings. FIG. 2 is a perspective view of an entire of a lawn mower corresponding to the hybrid type working machine according to an embodiment of the present invention, and FIG. 3 is a plan view of a main portion of the lawn mower. In FIG. 2, a pair of front wheels Wf and Wf is suspended to a front portion of a cutter housing 1 in the lawn mower, and a pair of rear wheels Wr and Wr is suspended to a rear portion of the cutter housing. A vertical type engine E in which an output shaft or a crankshaft is vertically provided is mounted in a center portion of the cutter housing 1, and an engine cover C is put on an upper protruding portion of the engine E. An operation handle H extending so as to rearward ascend toward a rear side is provided in both sides of a rear portion of the cutter housing 1, and a grass bag B for receiving mown lawn grasses is provided in the rear portion of the cutter housing 1.

In FIG. 3, a hollow cylindrical cutter chamber 3 that is open in a lower surface, that is, a ground surface side is formed in a center portion of the cutter housing 1, and a blade cutter (a working machine main body) 4 is received in the cutter chamber 3. The blade cutter 4 is connected with a crankshaft 5 of the engine E, and is driven by the engine so as to rotate within the cutter chamber 3.

A lawn grass discharging port 2 extending rearward from an outlet of the cutter chamber 3 and communicating with the grass bag B (refer to FIG. 2) is formed in a right side of the cutter housing 1 in a forward moving direction. The lawn grasses mowed by the blade cutter 4 are propelled by a blower (not shown) and collected in the grass bag B through the lawn grass discharging port 2. Such the blade cutter 4 and the blower are generally designated as the working tool for lawn mowing.

Rear wheel supporting members 14, 14 are respectively arranged in both right and left sides of the rear portion of the cutter housing 1, and axles 16, 16 of the rear wheels Wr and Wr are suspended to the supporting members 14, 14. The right and left supporting members 14, 14 are connected to each other by a connecting shaft 19, and output shafts 17, 18 are provided in parallel to the connecting shaft 19. One ends of the output shafts 17 and 18 are connected to an electric motor 7, another ends of the output shafts 17 and 18 extend respectively to the supporting members 14, 14 and are connected to the axles 16, 16 of the rear wheels Wr and Wr via a reduction gear mechanism 8.

Inside the engine cover C that covers the upper part of the engine E there is accommodated a recoil starter not illustrated. A starter grip 15 that is connected to a starter rope (not illustrated) is retained on the engine cover C.

Figure 4:
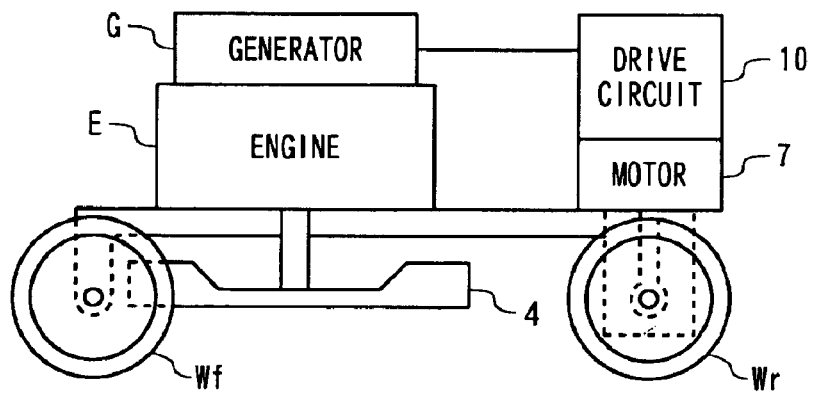
FIG. 4 is a block diagram illustrating the entire system of the lawn mower.

FIG. 4 is a block diagram illustrating the entire system of the lawn mower. A generator G is connected to the engine E. The generator G is, for example, an outer rotor type three-phase AC generator. The output of the generator G is connected to a drive circuit 10 for a motor 7, and the drive circuit 10 performs phase control on the alternating current that has been input from the generator G and supplies it to the motor 7. The motor 7 is, for example, a DC motor but may be a universal motor or the like as later described. The drive circuit 10 generates an output that conforms to that motor 7. The detail will be described later. The engine E can be switched in multiple stages to, for example, 3000, 2500, and 2000 rpm and the engine E is controlled so that it may be maintained at each of these numbers of revolutions, through the use of a mechanical type governor.

Figure 5:
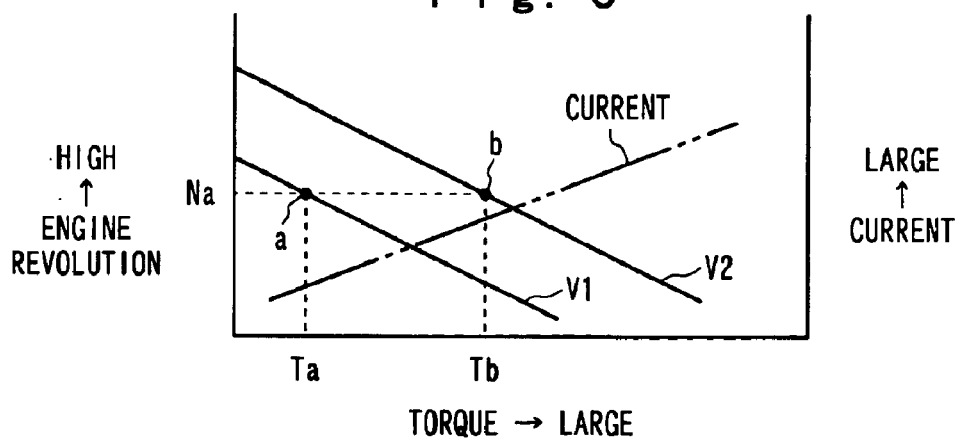
FIG. 5 is a graphic characteristic diagram of a motor, illustrating the relationship among the electric current, voltage, and torque.

The control for the moving speed of the lawn mower, namely the control for the motor 7 will now be explained. FIG. 5 is a graphic diagram illustrating the characteristic of the motor 7. In this figure, when the load increases during the travel that is made at an operating point (a) that is the intersection between the number of rotations Na and the torque Ta, for maintaining a number of rotations to a target, the characteristic moves to an operating point (b) that is the torque Tb. Namely, the voltage that is applied to the motor is altered from a voltage V1 to a voltage V2. As a result, the electric current increases, and the torque increases by the extent to which the load has increased, with the result that the number of rotations of the motor is maintained at the target number of rotations Na. Thereby, the lawn mower makes its travel with a fixed speed. However, it is within only a proper range of load with respect to the electric power that the generator G outputs that such fixed-speed travel is possible. In a range of overload that requires the use of an electric power the level of that is higher than the output that is limited by the output impedance of the generator G, with an increase in the load the electric current with respect to the motor increases, according to which the voltage decreases. As a result, the torque decreases, with the result that the number of rotations becomes unable to be maintained to the target as is, and hence the lawn mower makes a decreased-speed travel.

Figure 6:
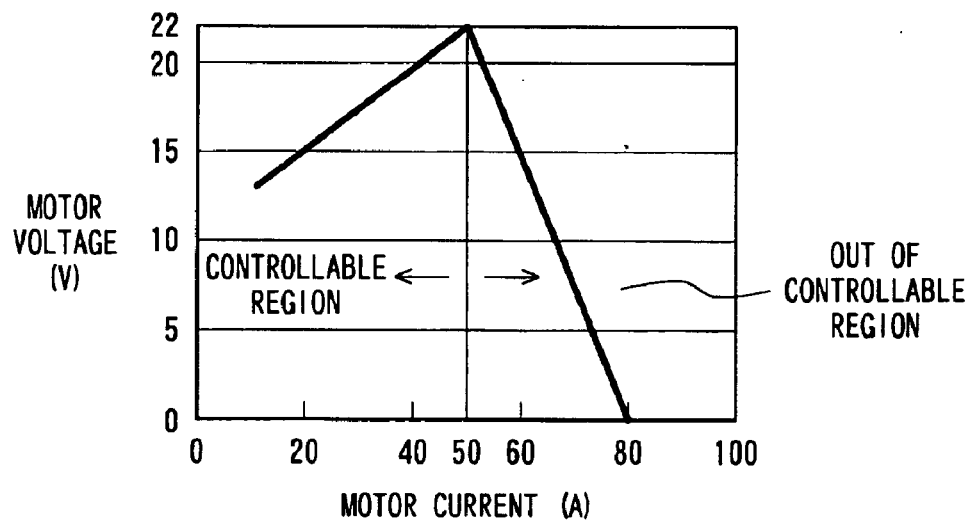
FIG. 6 is a graphic diagram illustrating the relationship between the electric current and voltage of the motor.

The explanation will now be given in further detail. FIG. 6 is a diagram illustrating the relationship between the motor current and the motor voltage inside of the controllable range as well as outside the controllable range, namely in the range of overload. In the controllable range, for maintaining the number of rotations to the target (e.g. 3000 rpm), as the electric current to the motor increases, namely the load increases, the motor voltage increases. This can be realized by the increase in the output of the generator G. Concrete control of the output will be described later.

On the other hand, in the range of overload, although as the load increase the electric current to the motor increases, since the output of the generator G is beyond the maximum value, the voltage cannot be maintained as is. Namely, the motor voltage gradually decreases. Like this, in a case where there is required the electric current to the motor (here 50 amperes) or more that corresponds to the maximum voltage (here 22 volts) that is limited by the output impedance of the generator G, it falls outside the controllable range that enables maintaining the number of rotations to the target.

Figure 7:
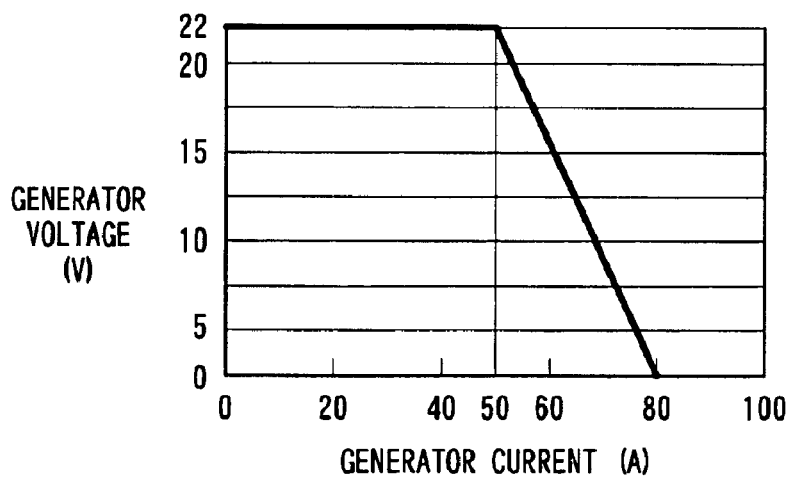
FIG. 7 is a graphic diagram illustrating the relationship between the electric current and voltage of the generator.

FIG. 7 illustrates the relationship between the electric current and voltage when the number of revolutions of the engine is 3000 rpm and the generator G has exhibited its maximum ability (when the electrical-conduction percentage is 100% as later described). The generator G outputs according to the maximum ability up to the output electric current of 50 amperes, and, even when the value of the output electric current increases, the output voltage thereof is maintained at a maximum voltage level of 22 volts. However, when the output electric current is 50 amperes or more, the output voltage gradually decreases. The maximum working ability electric current value of this generator G is 50 amperes. The characteristic of the motor 7 illustrated in FIG. 6 depends on the characteristic of that generator. In case of the output electric current the value of that is smaller than that maximum working ability electric current value, the number of revolutions of the engine is maintained at the target number of revolutions, e.g. 3000 rpm, which enables the machine to make a fixed-speed travel. Namely, the range the values within which are equal to or smaller than the maximum working ability electric current value is the range of control (the range of the electric current's being controllable) that enables the control to be performed by the drive circuit 10, whereas the range the values within which are greater than the maximum working ability electric current value is a range that is outside that range of control.

Figure 1:
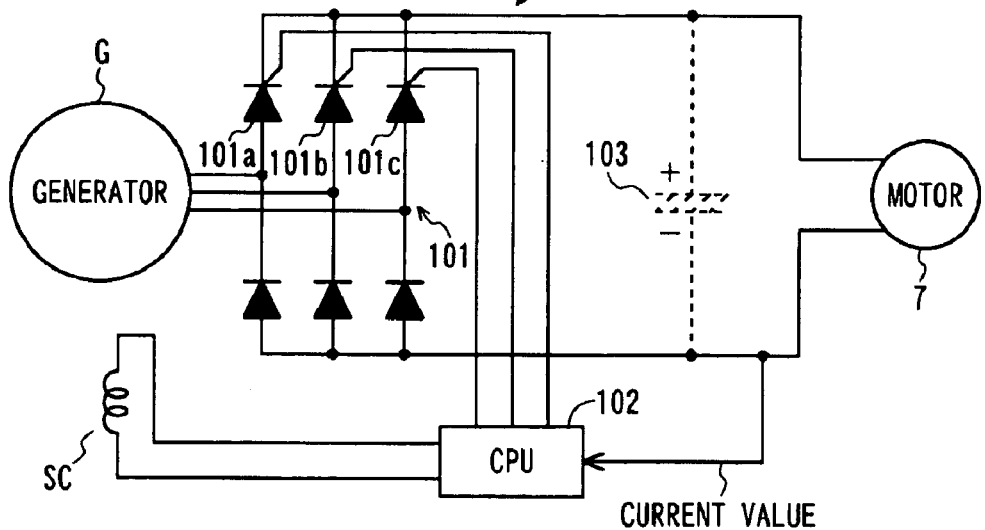
FIG. 1 is a drive circuit diagram of a drive circuit for a working machine according to an embodiment of the present invention.

In FIG. 1 there is illustrated an example of the drive circuit 10. The drive circuit 10 is equipped with a thyristor bridge 101 and a CPU 102. As indicated in dotted lines, a smoothing capacitor 103 may be provided therein. However, for achieving the miniaturization of the circuit unit, the use of that capacitor may be omitted. The motor 7 denotes a DC brush motor. The CPU 102 can obtain an electric power from a single-phase subsidiary winding (coil) SC of the generator G.

The CPU 102 detects the electric current to the motor, and performs phase control on thyristors 101a, 101b, and 101c according to that electric current of the motor, and controls the output of the motor 7. Namely, the CPU 102 changes the electrical-conduction phase angle, i.e. on-timing, of the thyristors to thereby control the electrical-conduction percentage within the waveform of the AC output signal of the generator G.

In FIG. 1, the drive circuit 10 detects the electric current to motor that corresponds to the load. When the load that is applied to the motor 7 changes, the motor current changes. Following the change in the motor current, the motor voltage also changes. For example, when during the operation the load increases and the motor current thereby increases, the motor voltage decreases. As a result, the number of rotations of the motor decreases followed by the decrease in the torque. If that is maintained, as it is, the speed of the travel decreases. Therefore, for maintaining the number of rotations to the target, it is carried out to increase the output and thereby increase the motor voltage.

Figure 8:
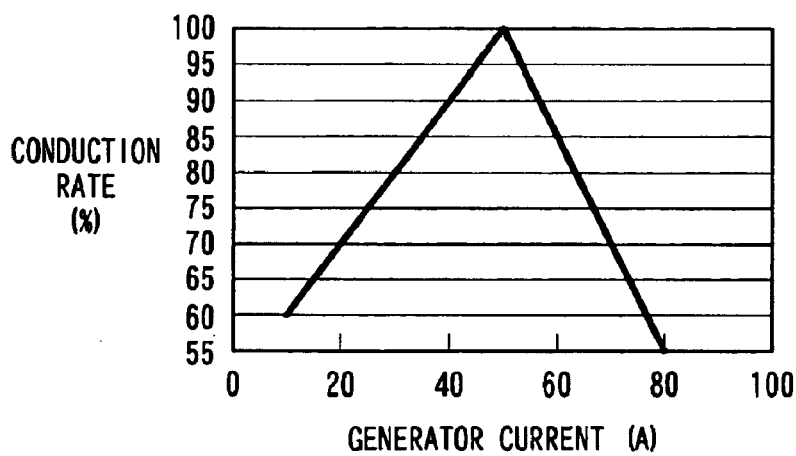
FIG. 8 is a graphic diagram illustrating the relationship between the proportion of electrical conduction of the thyristor and the electric current of the generator.

FIG. 8 is a diagram illustrating an example of the output electric current of the generator G corresponding to the electrical-conduction percentage of the thyristor, i.e. electric current to motor. The range that covers the electrical conduction percentage from 60 to 100% is the range of control (the range of the electric current's being controllable), within which the output is controlled. For example, it is assumed that the operation be in the state of being performed with the electrical-conduction percentage being 70% and the motor current being 20 amperes. If in such an operational state the load has increased and the motor current has increased up to 40 amperes, there is determined the electrical-conduction percentage that corresponds to the motor current, according to that FIG. 8. Namely, the electrical conduction percentage 70% is changed to the one of 90% that corresponds to the motor current of 40 amperes. As a result, the motor voltage increases, whereby the number of rotations is maintained to the target. As a result, the torque is prevented from decreasing, whereby the lawn mower makes a substantially fixed-speed, stable travel without that speed's being decreased.

In a case where a battery has been loaded, it is necessary to use a circuit for, under the assumption that excess-current resulting from a motor lock, etc. take place, detecting the electric current and stopping the operation of the relevant driving element when such excess-current has taken place for protecting it. In contrast to this, in the drive circuit 10 of this embodiment device, there is used no battery and it is arranged that the electric power be directly supplied from the generator G to the motor 7; and the maximum output electric power of the generator G fall below the level of the maximum control electric power that is supplied to the motor 7. Therefore, the capacity of the driving element (in the example of FIG. 1 the thyristor and diode) that is used in the drive circuit 10 can be determined by the maximum value of the output current of the generator G. Therefore, the use of any protection circuit with respect to the excessive amount of electric current can be omitted.

Figure 9:
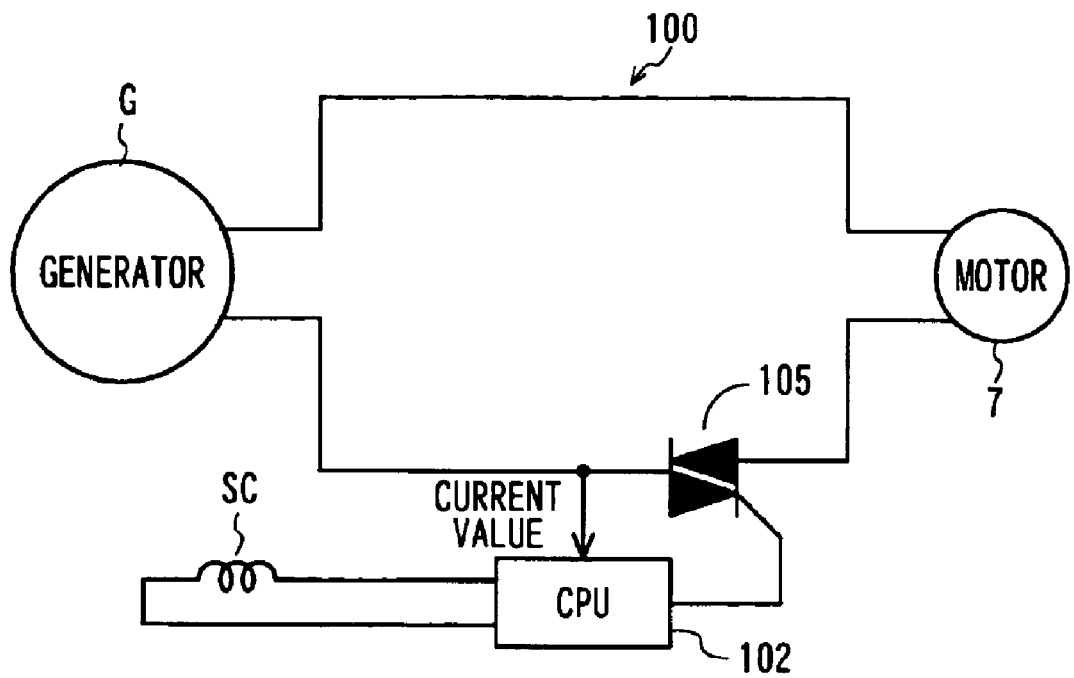
FIG. 9 is a drive circuit diagram illustrating a modification.

FIG. 9 is a circuit diagram according to a modification of the drive circuit. The same reference numerals and symbols as those in FIG. 1 are used to denote the same portions. In this figure, the generator G is a single-phase generator and the motor 7 is a universal motor. The drive circuit 100 includes a bi-directional thyristor 105 and the CPU 102 detects the electric current to the motor and controls turn-on timing of the bi-directional thyristor to cause the variation in the voltage in the motor 7 according to the electric current with respect thereto. Namely, when the load varies and the motor current varies accordingly, the drive circuit 100 causes the variation in the voltage of the motor 7 to cause the increase or decrease in the torque.

Figure 10:
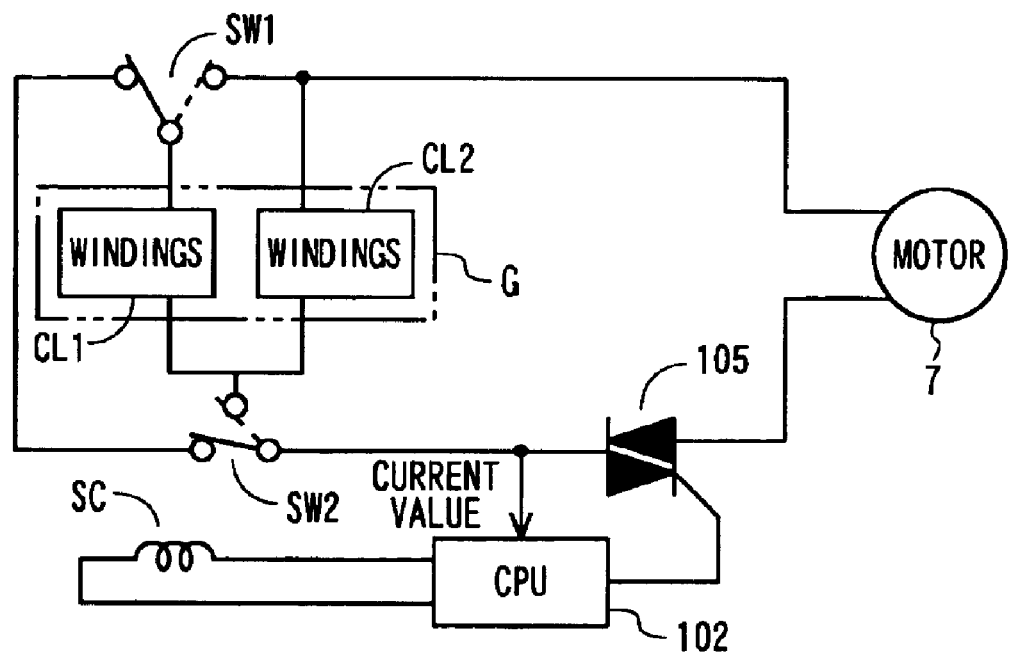
FIG. 10 is a drive circuit diagram illustrating a second modification.

FIG. 10 is a circuit diagram according to a second modification of the drive circuit. In this figure, the generator G is a single-phase generator, and the motor 7 is a universal motor. As in the case of the preceding modification, the voltage of the motor 7 is controlled according to the level of the load. The single-phase winding of the generator G is freely switchable between the serial connection and parallel connection through the use of the switches SW1 and SW2. Ordinarily, the switches SW1 and SW2 are switched to the solid line indicated position, whereby the windings (coils) CL1 and CL2 are brought to a serial connection and in this serial connection they are used. In a case where necessitating the use of a great motor 7 torque as at the time of acceleration, etc., the switches SW1 and SW2 are switched to the dotted line indicated positions, whereby the windings CL1 and CL2 are connected to each other in parallel. This is because it is possible to a larger electric current when they are connected in parallel. And, also, that is for the purpose of, in the ordinary operation necessitating no large torque, making small the relevant electric current to thereby mitigate the burden upon the generator G. For example, with a mode-changeover switch being provided, it is arranged that, in the working mode that necessitates the use of a large torque, the operator can select that parallel connection.

The output capacity of the generator G and the output of the motor 7 may be related to each other as follows. Namely, it is set that the output of the generator is motor rating+α (the capacity that is needed for acceleration from the stationary state to the travel state of motor). Namely, setting is done in such a way that the maximum working ability electric value the motor needs to have is equal to the maximum output electric current value of the generator G that is limited by the output impedance. By doing so, as described above, it is possible to do away with the protective function for the driving element of the drive circuit 10.

Although in the above-described embodiment the lawn mower has been described as an example of working machine, the invention is not limited thereto. The invention can be applied to various types of working machines, such as a plowing rotary and snow clearing auger of a power tiller and snow clearer, that include a working machine main body equipped with working tool members that are driven by an engine as well as a vehicle body that is driven by a motor for moving the working machine main body in the manner in which the vehicle body has it loaded thereon or has it connected thereto.

As will be apparent from the foregoing explanation, according the invention set forth in the embodiments of the present invention, the motor is driven using only the output alone of the generator as the power source without the intermediary of any auxiliary power source such as a battery. Accordingly, the batteries and the structure (the space and supporting members) for having the batteries loaded thereon are unnecessary, thereby miniaturizing the machine can be achieved. In addition, even in a case where no excess-current preventive circuit that becomes necessary when loading the batteries is provided, if the generator the output of that is appropriate is combined with the relevant motor, the electric current thereto is controlled by the output impedance of the generator. Accordingly, the construction of the relevant electric circuit can be simplified.

According to the invention as set forth in the embodiments of the present invention, regarding driving the working machine main body, an appropriate level of output can be ensured through a fixed-speed operation of the engine, while, regarding moving the working machine, that travel can simply be made through controlling the speed of the motor.

According to the invention as set forth in the embodiments of the present invention, despite the fact that the electric power is directly supplied from the generator to the motor, at the time when an excessive amount of electric current is fed to the motor the amount of electric power that is supplied to the motor is limited. Therefore, it is possible for the working machine main body to continue to do its work.

According to the invention as set forth in the embodiments of the present invention 4, the construction of an output stage to the motor from the generator is simple. According to the invention as set forth in the embodiments of the present invention, since it is possible to take out the output of the generator with a high efficiency, it is possible to make the machine small in size and make the capacity large. According to the invention as set forth in the embodiments of the present invention, in spite of the generator's being small in size, when it is necessary to use a large torque such as when acceleration is made, it is possible to obtain a large output.

What is claimed is:

1. A hybrid type self-travelling working machine, comprising:

a generator that is driven by an engine and a motor that is driven by an electric power that is supplied from the generator, wherein both a working machine main body and the generator are driven by the engine, the motor is a driving source for the working machine to travel, and the motor is driven by having directly supplied thereto only the electric power generated from the generator; and the output capacity of each of the generator and motor is set so that the maximum output electric power of the generator, which is limited by the output impedance of the generator, is equal to or less than the maximum control electric power that is required by the motor.

2. A hybrid type self-travelling working machine according to claim 1, wherein the engine is subjected to a substantially fixed speed operation.

3. A hybrid type self-travelling working machine according to claim 2, wherein regardless of the state of load of the motor an electric power is supplied thereto so as to maintain the number of rotations of the motor to be the one that corresponds to a substantially fixed speed; and at the time of overload's being applied to the motor the amount of electric power supplied thereto is decreased.

4. A hybrid type self-travelling working machine according to one of claims 1 to 3, wherein the generator is a single-phase generator;

the motor is a universal motor; and the machine comprises control means that controls the output of the generator by the alternating current phase control that is performed by means of a bi-directional thyristor.

5. A hybrid type self-travelling working machine according to one of claims 1 to 3, wherein the generator is a three-phase generator;

the motor is a DC motor; and the machine comprises control means that controls the output of the generator by the phase control that is performed by means of a thyristor bridge.

6. A hybrid type self-travelling working machine according to one of claims 1 to 3, wherein output windings of the generator are constructed in the way that a mode in which they are connected in parallel to each other and a mode in which they are connected in series to each other are freely switchable between the modes; and, when an ordinary operation is performed, the output windings are used in the form of their being connected in series and, when the torque of the motor is increased, the output windings are switched to the mode in which they are connected in parallel to each other.

7. A hybrid type self-traveling working machine according to claim 1, wherein the working machine main body is a cutter blade of a lawn mower.

* * * * *